United States Patent
Kaneko et al.

(10) Patent No.: US 6,544,575 B1
(45) Date of Patent: Apr. 8, 2003

(54) OIL-IN-WATER TYPE EMULSION COMPOSITION

(75) Inventors: Mikihiro Kaneko, Tokyo (JP); Kenji Ikeda, Tokyo (JP); Yasuo Okutomi, Tokyo (JP)

(73) Assignee: Asahi Denka Koygo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/857,046

(22) PCT Filed: Mar. 1, 2000

(86) PCT No.: PCT/JP00/01207

§ 371 (c)(1),
(2), (4) Date: May 31, 2001

(87) PCT Pub. No.: WO00/69271

PCT Pub. Date: Nov. 23, 2000

(30) Foreign Application Priority Data

Sep. 2, 1998 (JP) .......................................... 10-248758
May 14, 1999 (JP) .......................................... 11-133781

(51) Int. Cl.$^7$ ........................ A23D 7/00; A23L 1/0532
(52) U.S. Cl. ...................................... 426/575; 426/602
(58) Field of Search ............................... 426/575, 602, 426/603

(56) References Cited

U.S. PATENT DOCUMENTS

| | | | | | |
|---|---|---|---|---|---|
| 3,803,045 A | * | 4/1974 | Matsukawa et al. | ........... | 264/4 |
| 3,887,715 A | * | 6/1975 | Cante et al. | ................ | 426/570 |
| 3,892,873 A | * | 7/1975 | Kolen et al. | ................. | 426/602 |
| 3,907,770 A | * | 9/1975 | Strong | ........................ | 536/114 |
| 4,816,573 A | * | 3/1989 | Whitaker | ..................... | 514/54 |
| 4,961,953 A | * | 10/1990 | Singer et al. | ................ | 426/520 |
| 5,002,934 A | * | 3/1991 | Norton et al. | ................. | 424/49 |
| 5,192,577 A | * | 3/1993 | Masson | ....................... | 426/602 |
| 5,244,688 A | * | 9/1993 | Norton | ........................ | 426/601 |
| 5,302,408 A | * | 4/1994 | Cain et al. | ................... | 426/603 |
| 5,458,904 A | * | 10/1995 | Zolper | ........................ | 426/573 |
| 5,882,713 A | * | 3/1999 | Eskins et al. | ................. | 106/5 |
| 6,060,106 A | * | 5/2000 | Breitbart et al. | ............ | 426/573 |

FOREIGN PATENT DOCUMENTS

| | | | |
|---|---|---|---|
| CH | 0134952 | * | 3/1985 |
| JP | 52-125641 | | 10/1977 |
| JP | 2-42943 | | 2/1990 |
| JP | 4-264033 | | 9/1992 |
| JP | 06-225720 | | 8/1994 |
| JP | 6-228589 | | 8/1994 |
| JP | 7-23711 | | 1/1995 |

OTHER PUBLICATIONS

Derwent Abstract No. 1977–8579Y for JP 52125641.*
A. Harada et al., "Sogo Tatourui Kagaku (the second volume)", Kabushiki Kaisha Kodansha (1974), pp. 521–524.

* cited by examiner

*Primary Examiner*—Carolyn Paden
(74) *Attorney, Agent, or Firm*—Young & Thompson

(57) ABSTRACT

An oil-in-water type emulsion composition which comprises an oil or fat, water, a protein, and a carrageenan but is free from emulsifiers. The oil-in-water type emulsion composition, though not containing an emulsifier, shows high emulsion stability against physical stresses such as heating, freezing, stirring, kneading, etc.

3 Claims, No Drawings

OIL-IN-WATER TYPE EMULSION COMPOSITION

TECHNICAL FIELD

The present invention relates to an oil-in-water type emulsion composition which comprises a fat or oil, water, a protein, and a carrageenan but is free from emulsifiers, and to a process for producing the same.

BACKGROUND ART

For keeping their emulsified state stable, the majority of conventional emulsions having an oil-in-water type emulsion structure contain one or more than one emulsifiers, such as glycerol fatty acid esters, glycerol acetic acid fatty acid esters, glycerol lactic acid fatty acid esters, glycerol succinic acid fatty acid esters, glycerol diacetyltartaric acid fatty acid esters, sorbitan fatty acid esters, sucrose fatty acid esters, sucrose acetic acid isobutyric acid esters, polyglycerol fatty acid esters, polyglycerol condensed ricinoleic acid esters, propylene glycol fatty acid esters, stearoyl calcium lactate, stearoyl sodium lactate, polyoxyethylene sorbitan monostearate, and polyoxyethylene sorbitan monoglyceride, in their systems.

For the case where the use of an emulsifier alone is unable to bring out the intended physical properties, a number of attempts to solve such problem through the use of the emulsifier in combination with a stabilizer such as a polysaccharide thickener, a salt, and a pH adjuster have been made.

One example of such attempts is a process for producing a foamable oil-in-water type emulsion composition being a combination of a polyglycerol fatty acid ester, a polysaccharide thickener such as xanthan gum and λ-carrageenan, and an lipophilic processed starch (Japanese Patent Laid-Open Application No. 6-225720).

However, a problematic aspect of the addition of emulsifiers, including those mentioned above, is that their own taste and smell spoil the original flavor of food.

Furthermore, in recent years, there is such a strong, society-wide preference for foods that are more natural as is typified by a tendency for consumers to prefer foods that are free from synthetic emulsifiers and show more naturally emulsified state, and it is expected that this tendency will further continue growing.

Under the circumstances, the technique recited in the patent publication mentioned above in which the use of a polyglycerol fatty acid ester as an essential and indispensable component for bringing out the intended physical properties is a prerequisite does not meet the demand.

Although there exist techniques that relate to oil-in-water type emulsion compositions that contain protein but are free from emulsifiers as mentioned above, problems in terms of emulsion stability against physical stresses, such as modification of protein by heating or freezing and destruction of emulsified state by stirring or kneading, remain to be solved. Particularly, in the case of the use of a solid fat, there arises, for example, the problem that its crystal growth with time exerts a large influence on the emulsified state and emulsion stability of the resulting emulsion composition.

For such reasons, realization of an oil-in-water type emulsion composition which keeps its emulsified state firm and stable even without the aid of an emulsifier has strongly been desired.

Thus, it is an object of the present invention to provide an oil-in-water type emulsion composition which shows, even without an emulsifier, high emulsion stability against such physical stresses as heating, freezing, stirring, kneading, etc.

DISCLOSURE OF INVENTION

The present invention achieved the above-described object by providing an oil-in-water type emulsion composition which is characterized in that it comprises a fat or oil, water, a protein, and a carrageenan but is free from emulsifiers.

BEST MODE FOR CARRYING OUT THE INVENTION

Hereinafter, the oil-in-water type emulsion composition of the present invention will be described in further detail.

Although there is no particular restriction as to the oil or fat to be used in the present invention, examples thereof are a variety of vegetable and animal fats and oils typified by palm oil, palm kernel oil, coconut oil, corn oil, cotton seed oil, soybean oil, rapeseed oil, rice oil, sunflower oil, safflower oil, beef tallow, milk fat, lard, cacao fat, fish oil, and whale oil; and processed ones thereof obtained through one or more than one treatment steps selected from hydrogenation, fractionation, and transesterification. In the present invention, these oils and fats can be used either alone or in combination.

The amount of the fat or oil incorporated in the oil-in-water type emulsion composition of the present invention is preferably 4 to 85% by weight (hereinafter, abbreviated as "%"), more preferably 4 to 70%, much more preferably 4 to 50%.

Although there is no particular restriction as to the protein to be used in the present invention, examples thereof are whey proteins such as α-lactalbumin, β-lactoglobulin, and serum albumin; casein and other lactoproteins; low-density lipoproteins; high-density lipoproteins; egg proteins such as phosvitin, livetin, phosphoglycoprotein, ovalbumin, conalbumin, and ovomucoid; wheat proteins such as gliadin, glutenin, prolamine, and glutelin; and other animal and vegetable proteins. One or more than one of these proteins that can be employed in the present invention, or a food material containing one or more than one of these proteins, may be added to the composition, depending on the purpose.

Among the proteins listed above, the use of one or more than one proteins selected from whey proteins such as α-lactalbumin, β-lactoglobulin, and serum albumin, and casein, or the use of a food material containing one or more than one of these proteins is preferred.

The protein content of the oil-in-water type emulsion composition of the present invention is preferably 0.05 to 15%, more preferably 0.05 to 10%.

Examples of the carrageenan which is used in the present invention are κ-carrageenan, λ-carrageenan, ι-carrageenan, μ-carrageenan, ν-caffageenan, θ-cafageenan, ξ-carrageenan, π-carrageenan, and β-carrageenan. The carrageenan to be used in the present invention is one containing at least one or more of these.

Typical algae as a raw material from which the carrageenans mentioned above are derived are those of the genus Hypnea of the family Hypneaceae, the genus Eucheuma of the family Solieriaceae, the genus Chondrus of the family Gigartinaceae, the genus Gigartina, the genus Iredaea, and others. Of the above-mentioned carrageenans that can be used in the present invention, for example, algae of the genus Hypnea, the genus Eucheuma, the genus Chondrus, and the genus Iredaea are high in κ- and μ-carrageenan content. Moreover, algae of the genus Iredaea, the genus Gigartina, and the genus Chondrus are high in λ- and θ-carrageenan content. Algae of the genus Eucheuma are high in ι- and ν-carrageenan content. The carrageenan to be used in the present invention is a crude extract derived from any of these raw material, algae or its refined product.

Of the carrageenans mentioned above, preparation of the oil-in-water type emulsion composition using a carrageenan containing a carrageenan(s) other than κ-carrageenan is preferable because the stability of the resulting emulsion against physical stresses such as stirring is improved.

κ-carrageenan has the characteristic of forming a tough brittle gel with low elasticity in an aqueous solution. Especially, such tendency becomes apparent particularly in a system in which monovalent cations such as potassium ions, rubidium ions, and cesium ions are present, resulting in the formation of a tougher and more brittle gel.

In contrast to the oil-in-water type emulsion composition of the present invention being in a stably emulsified state, the reason why an oil-in-water type emulsion composition prepared using a carrageenan composed of κ-carrageenan alone is poor in emulsion stability could be assigned to the gelling properties κ-carrageenan possesses, but the details are not known.

Therefore, preferred as the carrageenan to be used in the present invention is one that contains a carrageenan other than κ-carrageenan, such as carageenans containing at least one or more carrageenans selected from λ-carrageenan, ι-carrageenan, μ-carrageenan, ν-carrageenan, θ-carrageenan, ξ-carrageenan, π-carrageenan, and β-carrageenan. More preferably, the carrageenan to be used in the present invention is one containing at least one or more carrageenans selected from λ-carrageenan, θ-carrageenan, and ν-carrageenan. Much more preferred is a carrageenan containing at least either λ-carrageenan or θ-carrageenan. Most preferred is a carrageenan containing λ-carrageenan.

The amount of the carrageenan contained in the oil-in-water type emulsion composition of the present invention is preferably 0.005 to 3%, more preferably 0.01 to 1%.

The oil-in-water type emulsion composition of the present invention comprises the fat or oil, protein, and carrageenan described above, and water. The water content of the oil-in-water type emulsion composition of the present invention is preferably 15 to 95%, more preferably 30 to 95%.

Particularly preferred as the oil-in-water type emulsion composition of the present invention is one comprised of 4 to 85% by weight of the fat or oil, 0.05 to 15% by weight of the protein, and 0.005 to 3% by weight of the carrageenan.

The reason why the oil-in-water type emulsion composition of the present invention can keep its emulsified state stable without an emulsifier is probably because the interaction between the protein and the carrageenan in the system (in the composition) takes part in the emulsification, but the details are not known.

If necessary, to the oil-in-water type emulsion composition of the present invention may be added the following components.

Sugars and sugar alcohols, starch, flour, inorganic salts and organic acid salts, gelling agents other than carrageenan, dairy products, egg products, cacao and cacao products, coffee and coffee products, and other various food materials; flavoring agents such as aromatizing agents and condiments; colorants; preservatives; antioxidants; pH adjusters; etc.

In the oil-in-water type emulsion composition of the present invention, the total content of these components is preferably 80% or less.

The oil-in-water type emulsion composition of the present invention can be used as an oil or fat kneaded into whipping cream, coffee whiteners, ice cream, soft ice cream premixes, bread, sweets, ham, sausages, and other processed foods, and is applicable for use in mayonnaise, dressings, cheese-like products, flour pastes, fillings, toppings, sandwich cream, spreads, etc.

The oil-in-water type emulsion composition of the present invention is produced by adding a protein to an aqueous phase and/or an oil phase, adding a carrageenan to the aqueous phase and/or the oil phase, and emulsifying the resulting aqueous and oil phases. In the process, in terms of workability, it is preferred that the carrageenan is added to the oil phase.

If necessary, the oil-in-water type emulsion composition of the present invention thus obtained may be homogenized by a homogenizing apparatus such as a valve-type homogenizer, a homomixer, and a colloid mill under a pressure of from 0 to 800 kg/cm$^2$. Moreover, if needed, the emulsion composition may be heat-sterilized or subjected to heat-sterilization treatment through, for example, UHT-, HTST-, or batch-treatment, in which the emulsion composition is directly heated by injection or infusion of steam, or indirectly heated by means of a plate-, tube-, or scraped surface heat exchanger. The emulsion composition may be heat-sterilized in a retort or by microwave heating, or cooked over a flame. If necessary, the emulsion composition may be rehomogenized. If necessary, the emulsion composition may be subjected to cooling operation such as quick cooling and gradual cooling. Moreover, if necessary, the emulsion composition may be aged.

Furthermore, if necessary, the oil-in-water type emulsion composition of the present invention thus obtained may be stored under refrigeration or in a frozen state.

Hereinafter, the present invention will be described in further detail with reference to Examples and Comparative Examples, but these should by no means be construed as defining the scope of the present invention.

EXAMPLE 1

49% by weight of palm oil in which 0.5% by weight of carrageenan A (κ-carrageenan content: 70% by weight, λ-carrageenan content: 30% by weight) was dispersed was, with its temperature adjusted to 60° C., dispersed in 49.5% by weight of warm water (60° C.) in which 1% by weight of a whey protein concentrate was dissolved (protein content: 80%, the principal constituents: β-lactalbumin, α-lactalbumin. Hereinafter, the same unless otherwise stated), followed by emulsification.

Thereafter, the emulsion thus obtained was homogenized at 60° C. under a pressure of 100 kg/cm$^2$ and then heated up to 100° C. using a scraped surface heat exchanger (the number of rotations: 1,200 r.p.m.). After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to is separate, showing its high emulsion stability also against physical and thermal stresses (see Table 1 shown below).

EXAMPLE 2

49% by weight of palm oil in which 0.5% by weight of carrageenan B (κ-carrageenan content: 100% by weight)

was dispersed was, with its temperature adjusted to 60° C., dispersed in 49.5% by weight of warm water (60° C.) in which 1% by weight of a whey protein concentrate was dissolved, followed by emulsification.

Thereafter, the emulsion thus obtained was homogenized at 60° C. under a pressure of 100 kg/cm$^2$ and then heated up to 100° C. using a scraped surface heat exchanger (the number of rotations: 1,200 r.p.m.). After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 1 shown below).

COMPARATIVE EXAMPLE 1

An oil-in-water type emulsion composition was prepared according to the same composition recipe and process as in Example 1 with the exceptions that the carrageenan used in Example 1 was not added and 50% by weight of warm water was used. Stirring the oil-in-water type emulsion composition thus obtained by a mixer under the same conditions as in Example 1 caused the oil contained therein to separate. Centrifugation of the emulsion composition adjusted in temperature to 60° C. for 20 minutes at a rate of 3,000 rotations per minute resulted in phase separation. Since the oil was distinctly separated, it could be seen that the emulsion composition was devoid of emulsion stability against physical and thermal stresses (see Table 1 shown below).

COMPARATIVE EXAMPLE 2

An oil-in-water type emulsion composition was prepared according to the same composition recipe and process as in Example 1 with the exceptions that the whey protein concentrate used in Example 1 was not added and 50.5% by weight of warm water was used. Its aqueous and oil phases were mixed by stirring, but they were unemulsifiable with each other, showing that the emulsion composition was devoid of emulsion stability against physical and thermal stresses (see Table 1 shown below).

COMPARATIVE EXAMPLE 3

An oil-in-water type emulsion composition was prepared according to the same composition recipe and process as in Example 1 with the exception of the use of 0.5% by weight of a sucrose fatty acid ester (HLB16) in lieu of the carrageenan added in Example 1, and its emulsion stability was evaluated in the same manner as in Example 1.

After the oil-in-water type emulsion composition obtained was stirred by a mixer, the temperature thereof was adjusted to 60° C. Centrifugation of the emulsion composition for 20 minutes at a rate of 3,000 rotations per minute resulted in distinct oil separation, showing its lack of emulsion stability against physical and thermal stresses (see Table 1 shown below).

COMPARATIVE EXAMPLE 4

An oil-in-water type emulsion composition was prepared according to the same composition recipe and process as in Example 1 with the exception that 0.5% by weight of a glycerol fatty acid ester (HLB4.3) was added in lieu of the carrageenan added in Example 1, and its emulsion stability was evaluated in the same manner as in Example 1.

After the oil-in-water type emulsion composition obtained was stirred by a mixer, the temperature thereof was adjusted to 60° C. Centrifugation of the emulsion composition for 20 minutes at a rate of 3,000 rotations per minute resulted in distinct oil separation, showing its lack of emulsion stability against physical and thermal stresses (see Table 1 shown below).

COMPARATIVE EXAMPLE 5

An oil-in-water type emulsion composition was prepared according to the same composition recipe and process as in Example 1 with the exception that 0.5% by weight of a polyglycerol fatty acid ester (HLB3, degree of polymerization: 10, degree of esterification: 10) was added in lieu of the carrageenan added in Example 1, and its emulsion stability was evaluated in the same manner as in Example 1.

After having been stirred by a mixer, the temperature of the oil-in-water type emulsion composition obtained was adjusted to 60° C. Centrifugation of the emulsion composition for 20 minutes at a rate of 3,000 rotations per minute resulted in distinct oil separation, showing its lack of emulsion stability against physical and thermal stresses (see Table 1 shown below).

TABLE 1 wt. %

| | Example | | Comparative Example | | | | |
|---|---|---|---|---|---|---|---|
| | 1 | 2 | 1 | 2 | 3 | 4 | 5 |
| Palm oil | 49 | 49 | 49 | 49 | 49 | 49 | 49 |
| Water | 49.5 | 49.5 | 50 | 50.5 | 49.5 | 49.5 | 49.5 |
| Whey protein concentrate | 1 | 1 | 1 | | 1 | 1 | 1 |
| Carrageenan A | 0.5 | | | | 0.5 | | |
| Carrageenan B | | 0.5 | | | | | |
| Sucrose fatty acid ester | | | | | | 0.5 | |
| Glycerol fatty acid ester | | | | | | | 0.5 |
| Polyglycerol fatty acid ester | | | | | | | 0.5 |
| Oil separation in oil-in-water type emulsion composition | | | | | | | |
| Before heating | − | − | ± | Not emul- sified | − | − | − |
| After heating | − | ± | +++ | | + | ++ | + |

Carrageenan A: containing 70% by weight of κ-carrageenan and 30% by weight of λ-carrageenan
Carrageenan B: containing 100% by weight of κ-carrageenan <Oil separation evaluation criteria>

−    no oil separation observed
±    oil separation slightly observed
+    some oil separation observed
++    oil separation observed
+++    considerable oil separation observed "Before heating": the homogenized emulsion was cooled to 5° C. and stirred by a mixer. Then, with its temperature adjusted to 60° C., the emulsion was subjected to centrifugation and evaluated.
"After heating": the homogenized emulsion, after heating, was cooled to 5° C. and stirred by a mixer. Then, with its temperature adjusted to 60° C., the emulsion was subjected to centrifugation and evaluated.

As is obvious from the results shown in Table 1, the oil-in-water type emulsion composition of the present invention, containing a protein and a carrageenan, showed neither changes in its emulsified state before and after the heat-sterilization nor oil separation. This indicates that the emulsion stability of the emulsion composition of the present invention is high. In contrast, the emulsion composition of Comparative Example 1 to which no carrageenan was added showed oil separation upon heating, showing considerable degradation of its emulsion stability. The emulsion composition of Comparative Example 2 to which no protein was added was unemulsifiable already at the stage of mixing. In Comparative Examples 3 to 5, after heating, the emulsion lost its emulsified state and the oil as separated, showing significant degradation of its emulsion stability.

EXAMPLE 3

40% by weight of palm oil in which 0.4% by weight of carrageenan A (κ-carrageenan content: 70% by weight, λ-farrageenan content: 30% by weight) was dispersed was, with its temperature adjusted to 60° C., dispersed in 56.6% by weight of warm water (60° C.) in which 3% by weight of a whey protein concentrate was dissolved, followed by emulsification.

Thereafter, the emulsion thus obtained was homogenized at 60° C. under a pressure of 100 kg/cm$^2$ and then heated up to 100° C. using a scraped surface heat exchanger (the number of rotations: 1,200 r.p.m.). After the emulsion was cooled down to 5° C., it was aged for 24 hours to prepare an oil-in-water type emulsion composition. Furthermore, the oil-in-water type emulsion composition obtained was frozen at −20° C. for 24 hours.

Allowing the frozen oil-in-water type emulsion composition to defrost at 15° C. did not cause the oil contained therein to separate, showing the emulsion's high emulsion stability against freezing (see Table 2 shown below).

COMPARATIVE EXAMPLE 6

An oil-in-water type emulsion composition was prepared according to the same composition recipe and process as in Example 3 with the exceptions that the carrageenan added in Example 3 was not added and that 57% by weight of warm water was used. Thereafter, the oil-in-water type emulsion composition thus obtained was frozen under the same conditions as in Example 3.

Allowing the frozen oil-in-water type emulsion composition to defrost at 15° C. caused the oil contained therein to separate, showing its lack of emulsion stability against freezing (see Table 2 shown below).

TABLE 2

| | | wt. % | |
|---|---|---|---|
| | | Example 3 | Comparative Example 6 |
| Palm oil | | 40 | 40 |
| Water | | 56.6 | 57 |
| Whey protein concentrate | | 3 | 3 |
| Carrageenan A | | 0.4 | |
| Oil separation in oil-in-water type emulsion composition | Before freezing | − | − |
| | After freezing | − | ++ |

Carrageenan A: containing 70% by weight of κ-carrageenan and 30% by weight of λ-carrageenan
<Oil separation evaluation criteria>
−no oil separation observed
++oil separation observed EXAMPLES 4 to 8

49% by weight of palm oil in which 0.005 to 0.2% by weight of carrageenan A (κ-caarageenan content: 70% by weight, λ-carrageenan content: 30% by weight) was dispersed was, with its temperature adjusted to 60° C., dispersed in 49.8 to 49.995% by weight of warm water (60° C.) in which 1% by weight of a whey protein concentrate was dissolved, followed by emulsification.

Thereafter, the emulsion thus obtained was homogenized at 60° C. under a pressure of 100 kg/cm$^2$ and then heated up to 100° C. using a scraped surface heat exchanger (the number of rotations: 1,200 r.p.m.). After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 3 shown below).

TABLE 3

| | | | | | wt. % |
|---|---|---|---|---|---|
| | | | Example | | |
| | 4 | 5 | 6 | 7 | 8 |
| Palm oil | 49 | 49 | 49 | 49 | 49 |
| Water | 49.8 | 49.9 | 49.95 | 49.98 | 49.995 |
| Whey protein concentrate | 1 | 1 | 1 | 1 | 1 |
| Carrageenan A | 0.2 | 0.1 | 0.05 | 0.2 | 0.005 |
| Oil separation in oil-in-water type emulsion composition | | | | | |
| Before heating | − | − | − | − | − |
| After heating | − | − | − | − | ± |

Carrageenan A: containing 70% by weight of κ-carrageenan and 30% by weight of λ-carrageenan
<Oil separation evaluation criteria>
−   no oil separation observed
±   oil separation slightly observed EXAMPLES 9 to 11

An oil-in-water type emulsion composition was prepared by: dispersing, with its temperature adjusted to 60° C., 60 to 85% by weight of palm oil in which 0.5% by weight of carrageenan A (κ-carrageenan content: 70% by weight, λ-carrageenan content: 30% by weight) was dispersed, in 13.5 to 38.5% by weight of warm water (60° C.) in which 1% by weight of a whey protein concentrate was dissolved; and emulsifying the mixture using a homomixer.

Thereafter, the emulsion thus obtained was homogenized at 60° C. under a pressure of 100 kg/cm$^2$ and then heated up to 100° C. using a scraped surface heat exchanger (the number of rotations: 1,200 r.p.m.). After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 4 shown below).

TABLE 4

| | | wt. % Example | | |
|---|---|---|---|---|
| | | 9 | 10 | 11 |
| Palm oil | | 60 | 70 | 85 |
| Water | | 38.5 | 28.5 | 13.5 |
| Whey protein concentrate | | 1 | 1 | 1 |
| Carrageenan A | | 0.5 | 0.5 | 0.5 |
| Oil separation in oil-in-water type emulsion composition | Before heating | – | – | – |
| | After heating | – | ± | + |

Carrageenan A: containing 70% by weight of κ-carrageenan and 30% by weight of λ-carrageenan
<Oil separation evaluation criteria>
–no oil separation observed
±oil separation slightly observed
+some oil separation observed

EXAMPLE 12

An emulsion prepared according to the same composition recipe as in Example 1 was homogenized at 60° C. under a pressure of 100 kg/cm². Using a VTIS sterilizer (manufactured by Alfa-Laval), the emulsion was then subjected to ultra-high temperature (UHT) sterilization at 146° C. for 6 seconds, followed by homogenization under a pressure of 70 kg/cm². After the emulsion was cooled down to 5° C., it was aged for 24 hours to prepare an oil-in-water type emulsion composition.

After the oil-in-water type emulsion composition thus obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 5 shown below).

EXAMPLE 13

An emulsion prepared according to the same composition recipe as in Example 2 was homogenized at 60° C. under a pressure of 100 kg/cm². Using a sterilizer for highly viscous food (manufactured by Kureha Engineering, Co., Ltd.), the emulsion was then subjected to ultra-high temperature (UHT) sterilization at 140° C. for 6 seconds. After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 5 shown below).

TABLE 5

| | wt. % Example | |
|---|---|---|
| | 12 | 13 |
| Palm oil | 49 | 49 |
| Water | 49.5 | 49.5 |
| Whey protein concentrate | 1 | 1 |
| Carrageenan A | 0.5 | |
| Carrageenan B | | 0.5 |
| Sucrose fatty acid ester | | |
| Glycerol fatty acid ester | | |
| Polyglycerol fatty acid ester | | |
| Oil separation in oil-in-water type emulsion composition | Before heating | – | – |
| | After heating | – | – |

Carrageenan A: containing 70% by weight of κ-carrageenan and 30% by weight of λ-carrageenan
Carrageenan B: containing 100% by weight of κ-carrageenan
<Oil separation evaluation criteria>
–no oil separation observed

EXAMPLE 14

49% by weight of palm oil in which 0.5% by weight of carrageenan C (μ-carrageenan content: not less then 40 by weight, λ-carrageenan content: not less than 40% by weight) was dispersed was, with its temperature adjusted to 60° C., dispersed in 49.5% by weight of warm water (60° C.) in which 1% by weight of a whey protein concentrate was dissolved, followed by emulsification. The carrageenan C was prepared through extraction from Chondrus Crispus with hot water followed by treatment with a 2.5% by weight of potassium chloride aqueous solution and alcohol precipitation.

Thereafter, the emulsion thus obtained was homogenized at 60° C. under a pressure of 100 kg/cm² and then heated up to 100° C. using a scraped surface heat exchanger (the number of rotations: 1,200 r.p.m.). After the emulsion was cooled down to 5° C., it was aged for 24 hours to prepare an oil-in-water type emulsion composition.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 6 shown below).

EXAMPLE 15

An oil-in-water type emulsion composition was prepared according to the same composition recipe and under the same conditions as in Example 14 with the exception of the use of 0.5% by weight of carrageenan D (κ-carrageenan content: not less than 40% by weight, θ-carrageenan content: not less than 40% by weight) in lieu of the carrageenan used in Example 14. The carrageenan D was one derived from carrageenan C through further treatment with an alkali followed by alcohol precipitation.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 6 shown below).

EXAMPLE 16

An oil-in-water type emulsion composition was prepared according to the same composition recipe and under the same conditions as in Example 14 with the exceptions of, in lieu of the carrageenan used in Example 14, the use of 2% by weight of carrageenan E (ν-carrageenan content: not less than 10% by weight) and a change in the amount of water to 48% by weight. The carrageenan E was prepared from Eucheuma Spinosum through extraction with hot water followed by alcohol precipitation.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 6 shown below).

EXAMPLE 17

An oil-in-water type emulsion composition was prepared according to the same composition recipe and under the same conditions as in Example 14 with the exception of the use of 0.5% by weight of carrageenan F (ι-carrageenan content: not less than 80% by weight) in lieu of the carrageenan used in Example 14. The carrageenan F was prepared from Eucheuma Spinosum through extraction with a hot alkaline aqueous solution followed by alcohol precipitation.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its high emulsion stability also against physical and thermal stresses (see Table 6 shown below).

EXAMPLE 18

An oil-in-water type emulsion composition was prepared according to the same composition recipe and under the same conditions as in Example 14 with the exception of the use of 0.5% by weight of carrageenan G (κ-carrageenan content: not less than 90% by weight) in lieu of the carrageenan used in Example 14. The carrageenan G was prepared from Chondrus Crispus through extraction with a hot alkaline aqueous solution followed by alcohol precipitation.

After the oil-in-water type emulsion composition obtained was stirred by a mixer, the temperature thereof was adjusted to 60° C. Centrifugation of the emulsion composition for 20 minutes at a rate of 3,000 rotations per minute did not cause the oil contained therein to separate, showing its emulsion stability against physical and thermal stresses (see Table 6 shown below).

COMPARATIVE EXAMPLE 7

An oil-in-water type emulsion composition was prepared according to the same composition recipe and process as in Example 14 with the exceptions that the carrageenan used in Example 14 was not added and 50% by weight of warm water was used. Stirring the oil-in-water type emulsion composition thus obtained by a mixer under the same conditions as in Example 14 caused the oil to separate. Centrifugation of the emulsion composition adjusted in temperature to 60° C. for 20 minutes at a rate of 3,000 rotations per minute resulted in phase separation. Since the oil was distinctly separated, it could be seen that the emulsion composition was devoid of emulsion stability against physical and thermal stresses (see Table 6 shown below).

COMPARATIVE EXAMPLE 8

An oil-in-water type emulsion composition was prepared according to the same composition recipe and process as in Example 14 with the exceptions that the whey protein concentrate added in Example 14 was not added and 50.5% by weight of warm water was used. Its aqueous phase and oil phase were mixed by stirring, but they were unemulsifiable with each other, showing that the emulsion composition was devoid of the emulsification ability and emulsion stability (see Table 6 shown below).

COMPARATIVE EXAMPLE 9

An oil-in-water type emulsion composition was prepared according to the same composition recipe and process as in Example 14 with the exception of the addition of 0.5% by weight of a sucrose fatty acid ester (HLB16) in lieu of the carrageenan added in Example 14, and its emulsion stability was evaluated in the same manner as in Example 14.

After the oil-in-water type emulsion composition obtained was stirred by a mixer, the temperature thereof was adjusted to 60° C. Centrifugation of the emulsion composition for 20 minutes at a rate of 3,000 rotations per minute resulted in distinct oil separation, showing its lack of emulsion stability against physical and thermal stresses (see Table 6 shown below).

COMPARATIVE EXAMPLE 10

An oil-in-water type emulsion composition was prepared according to the same composition recipe and process as in Example 14 with the exception that, in lieu of the carrageenan added in Example 14, 0.5% by weight of a glycerol fatty acid ester (HLB4.3) was added, and its emulsion stability was evaluated in the same manner as in Example 14.

After the oil-in-water type emulsion composition obtained was stirred by a mixer, the temperature thereof was adjusted to 60° C. Centrifugation of the emulsion composition for 20 minutes at a rate of 3,000 rotations per minute resulted in distinct oil separation, showing its lack of emulsion stability against physical and thermal stresses (see Table 6 shown below).

COMPARATIVE EXAMPLE 11

An oil-in-water type emulsion composition was prepared according to the same composition recipe and process as in Example 14 with the exception that 0.5% by weight of a polyglycerol fatty acid ester (HLB3, degree of polymerization: 10, degree of esterification: 10) was added in lieu of the carrageenan added in Example 14, and its emulsion stability was evaluated in the same manner as in Example 14.

After the oil-in-water type emulsion composition obtained was stirred by a mixer, the temperature thereof was adjusted to 60° C. Centrifugation of the emulsion composition for 20 minutes at a rate of 3,000 rotations per minute resulted in distinct oil separation, showing its lack of emulsion stability against physical and thermal stresses (see Table 6 shown below).

TABLE 6

| | Example | | | | | Comparative Example | | | | | wt. % |
|---|---|---|---|---|---|---|---|---|---|---|---|
| | 14 | 15 | 16 | 17 | 18 | 7 | 8 | 9 | 10 | 11 | |
| Palm oil | 49 | 49 | 49 | 49 | 49 | 49 | 49 | 49 | 49 | 49 | |
| Water | 49.5 | 49.5 | 48 | 49.5 | 49.5 | 50 | 50.5 | 49.5 | 49.5 | 49.5 | |
| Whey protein concentrate | 1 | 1 | 1 | 1 | 1 | 1 | | 1 | 1 | 1 | |
| Carrageenan C | 0.5 | | | | | | 0.5 | | | | |
| Carrageenan D | | 0.5 | | | | | | | | | |
| Carrageenan E | | | 2 | | | | | | | | |
| Carrageenan F | | | | 0.5 | | | | | | | |
| Carrageenan G | | | | | 0.5 | | | | | | |
| Sucrose fatty acid ester | | | | | | | | 0.5 | | | |
| Glycerol fatty acid ester | | | | | | | | | 0.5 | | |
| Polyglycerol fatty acid ester | | | | | | | | | | 0.5 | |
| Oil separation in oil-in-water type emulsion composition | | | | | | | | | | | |
| Before heating | – | – | – | – | – | ± | Not emul- sified | – | – | – | |
| After heating | – | – | – | – | ± | +++ | | + | ++ | + | |

Carrageenan C: containing 40% by weight or more of μ-carrageenan and 40% by weight or more of λ-carrageenan
Carrageenan D: containing 40% by weight or more of κ-carrageenan and 40% by weight or more of θ-carrageenan
Carrageenan E: containing 10% by weight or more of ν-carrageenan
Carrageenan F: containing 80% by weight or more of τ-carrageenan
Carrageenan G: containing 90% by weight or more of κ-carrageenan <Oil separation evaluation criteria>

–     no oil separation observed
±     oil separation slightly observed
+     some oil separation observed
++    oil separation observed
+++   considerable oil separation observed "Before heating": the homogenized emulsion was cooled to 5° C. and stirred by a mixer. Then, with its temperature adjusted to 60° C., the emulsion was subjected to centrifugation and evaluated.
"After heating": the homogenized emulsion, after heating, was cooled to 5° C. and stirred by a mixer. Then, with its temperature adjusted to 60° C., the emulsion was subjected to centrifugation and evaluated.

As is obvious from the results shown in Table 6, the oil-in-water type emulsion composition of the present invention, containing a protein and a carrageenan, showed neither changes in its emulsified state before and after the heat-sterilization nor oil separation. This indicates that the emulsion stability of the emulsion composition of the present invention is high. In contrast, the emulsion of Comparative Example 7 to which no carrageenan was added showed oil separation upon heating, showing considerable degradation of its emulsion stability. The emulsion of Comparative Example 8 to which no protein was added was unemulsifiable already at the stage of mixing. In Comparative Examples 9 to 11, after heating, the emulsion lost its emulsified state and the oil was separated, indicating significant degradation of its emulsion stability.

EXAMPLE 19

40% by weight of palm oil in which 0.4% by weight of carrageenan C (μ-carrageenan content: not less then 40 by weight, λ-carrageenan content: not less than 40% by weight) used in Example 14 was dispersed was, with its temperature adjusted to 60° C., dispersed in 56.6% by weight of warm water (60° C.) in which 3% by weight of a whey protein concentrate was dissolved, followed by emulsification.

Thereafter, the emulsion thus obtained was homogenized at 60° C. under a pressure of 100 kg/cm² and then heated up to 100° C. using a scraped surface heat exchanger (the number of rotations: 1,200 r.p.m.). After the emulsion was cooled down to 5° C., it was aged for 24 hours to prepare an oil-in-water type emulsion composition. Furthermore, the oil-in-water type emulsion composition was frozen at −20° C. for 24 hours.

Allowing the frozen oil-in-water type emulsion composition to defrost at 15° C. did not cause the oil contained therein to separate, showing its high emulsion stability also against freezing (see Table 7 shown below).

EXAMPLE 20

An oil-in-water type emulsion composition was prepared according to the same composition recipe and under the same conditions as in Example 19 with the exception of the use of, in lieu of the carrageenan used in Example 19, 0.4% by weight of carrageenan D (κ-carrageenan content: not less than 40% by weight, θ-carrageenan content: not less than 40% by weight) used in Example 15. Furthermore, the oil-in-water type emulsion composition was frozen under the same conditions as in Example 19.

Allowing the frozen oil-in-water type emulsion composition to defrost at 15° C. did not cause the oil contained therein to separate, showing its high emulsion stability also against freezing (see Table 7 shown below).

EXAMPLE 21

An oil-in-water type emulsion composition was prepared according to the same composition recipe and under the same conditions as in Example 19 with the exceptions of the use of, in lieu of the carrageenan used in Example 19, 1.6% by weight of carrageenan E (ν-carrageenan content: not less than 10% by weight) used in Example 16 and a change in the amount of water to 55.4% by weight. Furthermore, the oil-in-water type emulsion composition thus obtained was frozen under the same conditions as in Example 19.

Allowing the frozen oil-in-water type emulsion composition to defrost at 15° C. did not cause the oil contained therein to separate, showing its high emulsion stability also against freezing (see Table 7 shown below).

EXAMPLE 22

An oil-in-water type emulsion composition was prepared according to the same composition recipe and under the same conditions as in Example 19 with the exception of the use of, in lieu of the carrageenan used in Example 19, 0.4% by weight of carrageenan F (ι-carrageenan content: not less than 80% by weight) used in Example 17. Furthermore, the oil-in-water type emulsion composition was frozen under the same conditions as in Example 19.

Allowing the frozen oil-in-water type emulsion composition to defrost at 15° C. did not cause the oil contained therein to separate, showing its high emulsion stability also against freezing (see Table 7 shown below).

COMPARATIVE EXAMPLE 12

An oil-in-water type emulsion composition was prepared according to the same composition recipe and process as in Example 19 with the exceptions that the carrageenan used in Example 19 was not added and 57% by weight of warm water was used. Furthermore, the oil-in-water type emulsion composition was frozen under the same conditions as in Example 19.

Allowing the frozen oil-in-water type emulsion composition to defrost at 15° C. caused the oil contained therein to separate, showing its lack of emulsion stability against freezing (see Table 7 shown below).

TABLE 7

|  | Example | | | | wt. % Comparative Example |
|---|---|---|---|---|---|
|  | 19 | 20 | 21 | 22 | 12 |
| Palm oil | 40 | 40 | 40 | 40 | 40 |
| Water | 56.6 | 56.6 | 55.4 | 56.6 | 57 |
| Whey protein concentrate | 3 | 3 | 3 | 3 | 3 |

TABLE 7-continued

|  | Example | | | | wt. % Comparative Example |
|---|---|---|---|---|---|
|  | 19 | 20 | 21 | 22 | 12 |
| Carrageenan C | 0.4 | | | | |
| Carrageenan D | | 0.4 | | | |
| Carrageenan E | | | 1.6 | | |
| Carrageenan F | | | | 0.4 | |
| Oil separation in oil-in-water type emulsion composition | | | | | |
| Before freezing | − | − | − | − | − |
| After freezing | − | − | − | − | ++ |

Carrageenan C: containing 40% by weight or more of $\mu$-carrageenan and 40% by weight or more of $\lambda$-carrageenan
Carrageenan D: containing 40% by weight or more of $\kappa$-carrageenan and 40% by weight or more of $\theta$-carrageenan
Carrageenan E: containing 10% by weight or more of $\nu$-carrageenan
Carrageenan F: containing 80% by weight or more of $\iota$-carrageenan <Oil separation evaluation criteria>

− no oil separation observed
++ oil separation observed

INDUSTRIAL APPLICABILITY

The oil-in-water type emulsion composition of the present invention has, though not containing an emulsifier, high emulsion activity and shows extremely high emulsion stability also against such physical stresses as heating and stirring.

What is claimed is:

1. An oil-in-water type emulsion composition characterized by comprising an oil or fat, water, a protein, and a carrageenan containing $\lambda$-carrageenan but is free from emulsifiers.

2. The oil-in-water type emulsion composition according to claim 1, which comprises 4 to 85% by weight of the oil or fat, 0.05 to 15% by weight of the protein, and 0.005 to 3% by weight of the carrageenan containing $\lambda$-carrageenan.

3. A process for producing an oil-in-water type emulsion composition, said method characterized by comprising the steps of adding a protein to an aqueous phase and/or an oil phase; adding a carrageenan containing $\lambda$-carrageenan to the aqueous phase and/or the oil phase; and emulsifying the resulting aqueous and oil phases.

* * * * *